UNITED STATES PATENT OFFICE.

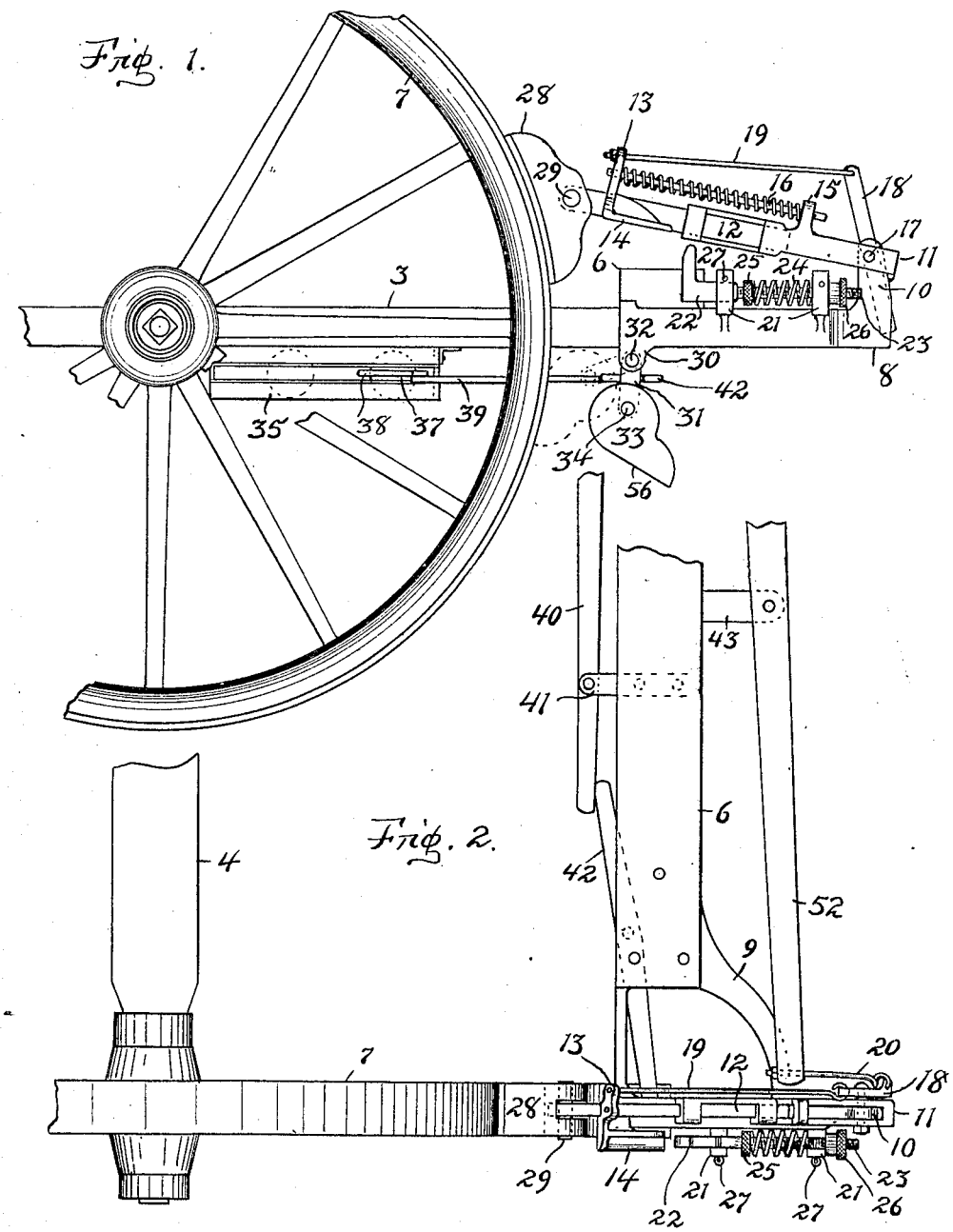

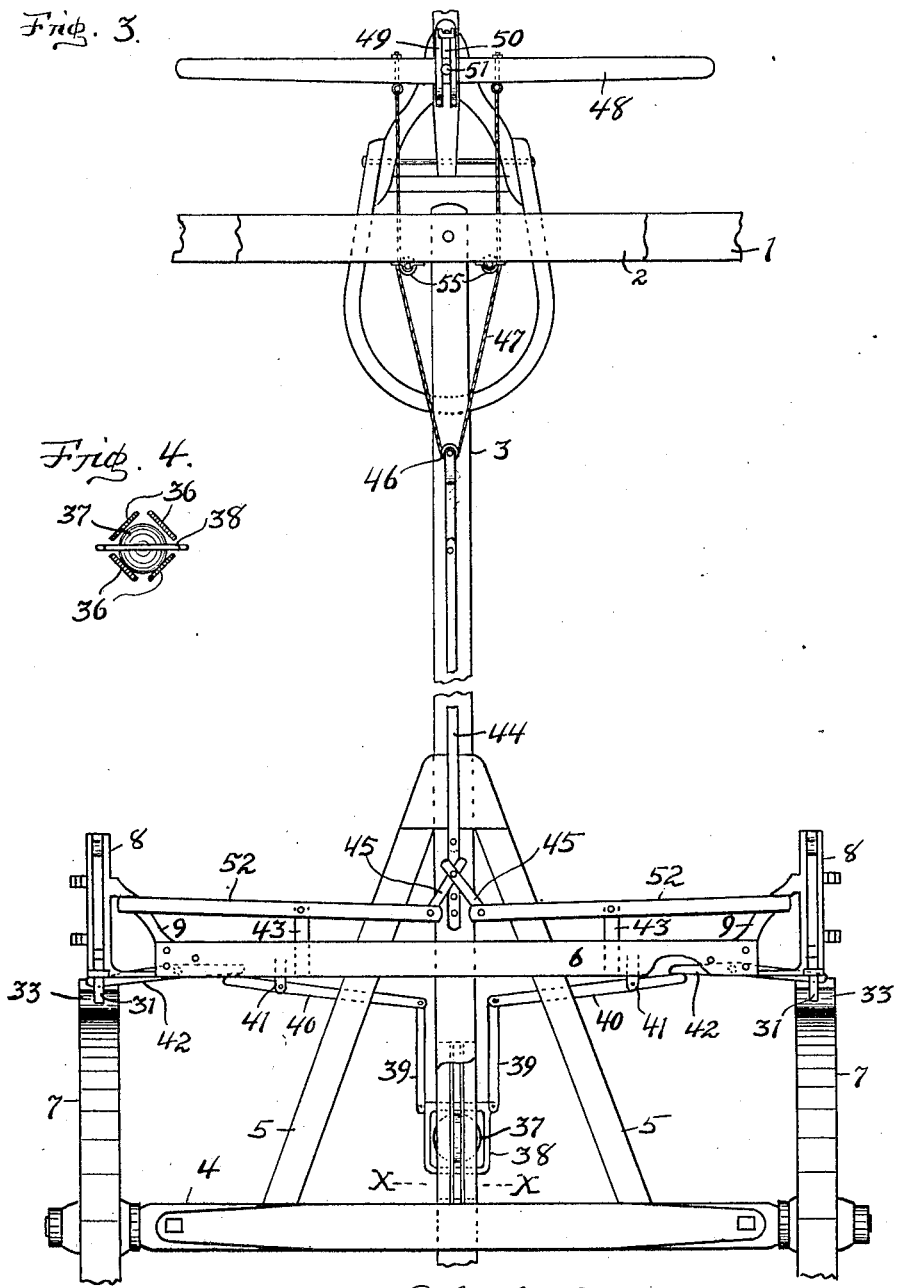

CHARLES GARVER, OF FORT WAYNE, INDIANA.

AUTOMATIC WAGON-BRAKE.

No. 856,693.　　　Specification of Letters Patent.　　　Patented June 11, 1907.

Application filed February 1, 1906. Serial No. 298,904.

*To all whom it may concern:*

Be it known that I, CHARLES GARVER, a citizen of the United States, residing at Fort Wayne, in the county of Allen, in the State of Indiana, have invented certain new and useful Improvements in Automatic Wagon-Brakes; and I do hereby declare that the following is a full, clear, and exact description of the invention, which will enable others skilled in the art to which it appertains to make and use the same, reference being had to the accompanying drawings, which form part of this specification.

My invention relates to improvements in automatic wagon brakes.

My present invention has for its primary object the provision of a simple, convenient, reliable and efficient wagon-brake adapted to automatically exert its power upon a vehicle approximately proportional to the down grade and load, and also adapted to automatically lock the vehicle against a retrograde movement upon an incline when the vehicle has been temporarily halted in its ascent thereof.

My invention consists of a pair of companion brakes arranged in coöperative relation with the rear wheels; means for applying the brakes to the rear wheels with varying power; means for automatically releasing the brakes; means for automatically locking the vehicle against a retrograde movement upon an incline; and means for permitting a free swinging movement of either the front axle or the double-tree without any derangement or interference with the brake actuating means.

The principal novel features of my invention are the means for applying the brakes; the means for locking the vehicle against a retrograde movement upon an incline; and the means for guarding the brake mechanism against interference by a swinging movement of the double-tree.

Similar reference numerals indicate like parts throughout the several views of the drawings, in which Figure 1 is a side elevation of the brake mechanism applied to the front of the rear wagon-wheel partly broken away, and showing the relative arrangement of the uphill brake and its actuating means. Fig. 2 is a plan view of a similar arrangement of the brake mechanism. Fig. 3 is a plan view of a portion of a vehicle to which my invention has been applied with the down-hill brake mechanism removed. Fig. 4 is a cross-section through the race-way on the line X—X of Fig. 3 showing the relative arrangement of the initial means for actuating the uphill brake.

To the front axle 1 beneath the sandboard 2 is pivotally secured the forward end of the reach 3 in the usual manner, Fig. 3. The rear end of this reach is connected with the rear axle 4 and hounds 5 in the usual manner. At a proper point on the rear hounds is fixed a horizontal transverse brake-beam 6 in proper relation to the adjacent perimeter of the rear wagon wheels 7.

My improved brake mechanism is duplicated, one being provided for each rear wheel, and mounted upon the supporting casting 8 having upon its inner face a lateral bracket-arm 9 which is rigidly secured to the lower face of respective ends of the beam 6. The forward end of the casting 8 has an upright laterally apertured lug 10 having a fixed pivot 17 on which is pivotally mounted the bifurcated forward end of the arm 11, whose rear end is longitudinally apertured to receive the sliding arm 12 provided near its rear end with the upright lug 13 having upon its outer face a lateral lug 14 for the purpose hereafter described. On the rear extremity of the arm 12 is pivotally mounted the brake-shoe 28 in any suitable manner, preferably by means of the pin 29, Fig. 1. The arm 11 has near the middle of its length an upright apertured lug 15 in which is fixed one end of the rod 16 whose other end is slidably mounted in the lug 13, on this rod is loosely mounted the coil-spring 16 with its ends bearing against the respective lugs 13 and 15, thereby tending to hold the arm 12 in the extended position shown in Fig. 1.

On the inner extended end of the pivot 17 is loosely mounted the lever 18 whose upper end is pivotally connected to the lug 13 by means of the rod 19. The lower end of the lever 18 is pivotally connected to the adjacent outer end of the lever 52 by means of the short rod 20, Fig. 2.

The outer face of the casting 8 is provided with a pair of vertically recessed upright lugs 21 in which is slidably mounted the foot 22 having a screw-threaded shank 23 on which is loosely mounted the coiled spring 24 having one end bearing against the outer lug 21 and its inner end bearing against the milled adjusting nut 25. The foot 22 is longitudinally adjustable by means of the milled nut 26. The foot 22 and its shank 23 is secured in position by means of the removable pins 27.

From the pendant laterally apertured lug 30 on the rear end of the casting 8 is pivotally suspended the short arm 31 by means of the pin 32. On the lower end of this arm 31 is pivotally mounted a pear-shaped brake-shoe 33, Fig. 1 by means of the pin 34.

To the lower face of the reach 3 near the rear axle is rigidly fixed a ball race-way 35 of any proper construction, but preferably formed of a plurality of plates 36, in diagonal arrangement relative to a horizontal plane, and having their adjacent edges separated by a proper space, Fig. 4. In this race-way is loosely mounted a metallic ball 37 of proper weight, inclosed by a follower frame 38. To the forward side of this follower are pivotally secured the companion levers 39, Fig. 1, whose forward ends are pivotally connected to the adjacent inner ends of the respective transverse levers 40 pivotally fulcrumed in the fixed hangers 41 on the beam 6.

On the lower face of the beam 6 near its opposite ends are pivotally fulcrumed the horizontal levers 42 whose outer ends are adapted for an actuating engagement with the respective pendant-arms 31 and whose inner ends are adapted to be actuated by the outer ends of the respective levers 40, Fig. 3.

On the lower face of the beam 6 are fixed the forwardly projecting hangers 43 on which are fulcrumed the companion levers 52 whose inner ends are pivotally connected to the bar 44 at or near its rear end by means of the short rods 45. This bar 44, arranged in longitudinal vertical alinement with the reach 3, has a small loose pulley or idler 46 in its forward end on which is arranged a rope or cable 47 whose ends are secured to the double-tree 48 at points equally distant from its center, and upon opposite sides thereof. The cable 47 also passes over the guide-pulleys or idlers 55 on the rear edge of the sand-board 2. This double-tree, of common form, is loosely mounted in an arched metal strap 49 having a longitudinal slot 50 in which is arranged a pin 51 fixed in the double tree midway of its ends to prevent any lateral derangement thereof, whereby the double-tree has a limited longitudinal play in the strap.

The operation of my invention thus described is briefly stated as follows:—So long as a sufficient draft is exerted upon the double-tree to draw the vehicle the double tree will be slightly forward of the position shown in Fig. 3 with the pin 51 resting in the forward position of the slot 50, thereby securely holding the brake-shoes 28 out of contact with the wheels through the medium of its connecting means consisting of the cable 47, the bar 44, rods 45 levers 52, rods 20, levers 18, rods 19 and arms 12, and against the stress of the coil spring 16, the strength of which is normally sufficient to force the brake-shoe into contact with the wheel. Obviously, when the double-tree is relieved of draft thereon it, as well as the other above mentioned connecting means will automatically assume the respective positions shown in Fig. 1 and 3 under the recoil or stress of the spring 16, thereby forcing the arm 12 rearwardly and bringing the shoe 28 into contact with the perimeter of the wheel above the horizontal plane of the wheel hub 53, and of the fulcrum 17 of the arm 11, whereby the greater the load on the vehicle the greater will be the consequent strain upon the brake-shoe and upon the coil spring 16, because since the shoe 28 engages the wheel above the plane of the fulcrum of the shoe supporting arm, the forward movement of the wheel will force the shoe downward against the stress of the spring 16. This stress upon the shoe will be proportional to the load because the further the shoe is forced downward the more it shortens the distance between the shoe and its fulcrum. When the shoe 28 has been thus forced downward a predetermined limit the forward end of the lug 14 on the arm 12 will engage the adjacent face of the foot 22, whereby the resisting power of the brake will be increased by the additional resistance of the spring 24. These two springs can, of course, be of any proper strength. When draft is again applied to the double-tree, as when for example the vehicle has reached the bottom of the hill or incline, the said connecting means will be forwardly actuated as described, thereby, automatically with-drawing it from its engagement, in which position it will remain so long as the double tree is retained by the draft in its forward limit. It is thus seen that the action of the brake is automatic, and that the power exerted by the brake is approximately proportional to the weight of the load. It is evident that as the cable 47 passes over the guide pulleys 55 and the idler 46 any swinging motion of the double-tree as in turning the vehicle will have no effect upon the brake actuating means or connections.

The operation of the uphill brake is as follows:—The shoe 33 is so suspended as to normally hang in the position shown in full lines in Fig. 1 with the ball 37 and its containing case resting in the forward end of the raceway. When the vehicle starts to ascend an incline the ball will descend by gravity to the other end of the race-way, carrying with it its containing cage, thereby actuating the levers 39, 40, and 42, and elevating the shoe 33 to the position shown in Fig. 1 in contact with the wheel. As this shoe is eccentrically mounted the forward motion of the wheel has no tendency to form a locking engagement therewith, simply keeps up a bobbing contact having no appreciable friction. As soon however, as the wheel starts upon a retrograde movement, it will firmly engage the adjacent plane face 56 of the shoe 33 and force it upward, thereby decreasing the distance between its fulcrum point and the wheel because of the curvature of the perimeter of the wheel, thereby firmly wedging the shoe into a holding engagement and prevents any retrograde movement upon an incline. Obviously, as soon as the wheel is given a forward motion it will unlock the shoe, and keep it bobbing harmlessly upon its perimeter as before. When descending an incline the ball 37 will return by gravity to its former position at the forward end of the race-way, thereby forcing the shoe 33 away from contact with the wheel.

When the vehicle is upon level ground the shoe 33, having a tendency to assume by gravity the position shown in Fig. 1, because its greater weight is below its pivoted point, will itself move the ball forward sufficiently to cause it to remain out of contact with the wheel.

Having thus described my invention and the manner of employing the same what I desire to secure by Letters Patent is:

1. In an automatic wagon-brake, a movable double-tree; a brake-shoe operatively connected with the double-tree; means for normally actuating the brake-shoe against the draft of the motive power upon the double-tree; and auxiliary means for automatically increasing the holding power of the initial brake-shoe actuating means after it has been brought into action.

2. In an automatic wagon-brake, a laterally slidable double-tree; a plurality of brake-shoes adapted to engage the rear wheels of the vehicle; a flexible connection between the double-tree and the brake-shoes; means for normally actuating the brake-shoes and for correspondingly actuating the double-tree simultaneously; auxiliary means for automatically increasing the power of the brake actuating means after it has been brought into action; and means for automatically bringing the auxiliary means into action after the brake-shoe has been pressed to its engagement by the said initial actuating means.

3. In an automatic wagon-brake, a supporting casting; a two-part extensible arm pivoted at one end on said casting and carrying upon its other end a pivoted brake-shoe in coöperative relation with the perimeter of the rear wheel; means for normally maintaining the said arm in its extended position to bring the shoe into action against the draft upon the vehicle; means for overcoming the arm extensible means by the action of the said draft and auxiliary means for increasing the holding power of the initial brake-shoe actuating means.

4. In wagon-brake mechanism means for automatically locking the vehicle against a retrograde movement upon an incline consisting of an eccentric brake-shoe pivotally suspended from a proper support in coöperative relation with the rear wheel and below the plane of its axial center, a horizontal raceway; a ball movable on said raceway by gravity; and a pivotal actuating connection between said ball and said brake shoe.

5. An automatic vehicle brake, adapted to prevent a retrograde movement upon an incline, consisting of a ball raceway in horizontal-arrangement; a ball mounted on said raceway and actuated thereon by gravity; and an eccentric brake-shoe pivotally suspended below the plane of the axial center of the wheel and in coöperative relation with the perimeter thereof.

Signed by me at Fort Wayne, Allen county, State of Indiana, this 29th day of January, A. D. 1906.

CHARLES GARVER.

Witnesses:
WATTS B. DENNY,
LULU E. BULMAHN.